July 7, 1959  J. SZYDLOWSKI  2,893,481
SYSTEM FOR SUPPLYING FUEL FOR TURBOJET ENGINES
Filed May 31, 1957
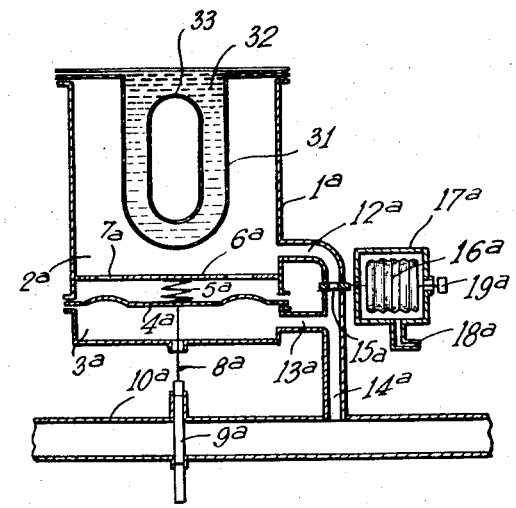

2,893,481

SYSTEM FOR SUPPLYING FUEL FOR TURBOJET ENGINES

Joseph Szydlowski, Usine Turbomeca, Bordes, France

Application May 31, 1957, Serial No. 662,916

Claims priority, application France June 15, 1956

3 Claims. (Cl. 158—36)

The present invention relates to an improvement in the U.S. patent application Serial No. 524,130, filed on July 25, 1955, by the applicant for: "Method of and Device for Adjusting the Acceleration Time of Turbojet Engines."

In this prior patent application there is described a method of controlling the acceleration time of a turbojet engine fed with fuel through a feed line and a feed nozzle by a fuel pump according to which any instantaneous increase in the fuel supply pressure occurring in the turbojet fuel feed line (between the fuel pump and the engine feed nozzle) is instantaneously stored outside of said line upstream of its part connected to said nozzle, then subsequently restored in said part of the fuel feed line with a predetermined time-lag, if the duration of said increase in the fuel supply pressure is greater than that of said time-lag, said time-lag being either constant or a function of the altitude and flying speed of the aircraft.

In this prior application there is also described a devise for controlling the acceleration time of a jet engine which comprises a container divided into two chambers by a resilient diaphragm connected directly or indirectly through one of these chambers to an adjustable valve inserted in the fuel feed pipe line after the gas throttle valve, the other chamber constituting a housing receiving another wall of flexible material, responsive to pressure variations and without connection with said valve, these chambers being interconnected through a by-pass connected in turn to the fuel feed pipe line after said valve, the cross-sectional area of this by-pass being controlled by a variable area orifice.

According to an advantageous embodiment of the invention which is described in this prior patent application the aforesaid controlling device has its other flexible wall in said other chamber constituted by an air-filled resilient bladder. However, experience proved that this resilient bladder was not absolutely leak-proof in all circumstances, in the air-to-fuel direction.

In order to avoid this serious drawback it is the object of the present invention to provide a device for controlling the time of acceleration of a jet engine under the influence of an overpressure occurring in its fuel feed pipe line when opening the fuel throttle valve, this device being of the type comprising a container divided into two chambers by an elastic diaphragm connected directly or indirectly through one of these chambers to an adjustable valve inserted in the fuel pipe line after the gas throttle valve, these chambers being interconnected through a by-pass having an adjustable cross-sectional passage area and a pipe section connecting the by-pass to said fuel feed pipe line after said adjustable valve, the other chamber constituting a housing for an air-filled elastic bladder without connection with said valve, this device being characterized in that the air-filled elastic bladder is sealed and immersed in a vessel having an elastic wall, located in the other chamber and filled with an intermediate fluid of such nature that the materials that may be used in the manufacture of this sealed elastic bladder and of the elastic wall ensure the necessary tightness between the air and the intermediate fluid, on the one hand, and between the intermediate fluid and the fuel, on the other hand.

In case the sealed elastic bladder and the elastic wall were manufactured from a synthetic rubber composition, the intermediate fluid may consist preferably of anhydrous glycerin at 30° Bé.

In order to afford a clearer understanding of the present invention and of the manner in which the same may be carried out in the practice, reference will now be made to the accompanying drawing forming part of this specification and illustrating diagrammatically by way of example a typical embodiment of the invention.

The single figure of the drawing shows the same component elements as those constituting the embodiment illustrated and described in Fig. 1 of the aforesaid prior patent application, these elements being designated by the same reference numerals but followed by the letter a.

The acceleration time adjustment device comprises a container 1a divided into two chambers 2a and 3a by a resilient diaphragm 4a. This diaphgram is operatively connection to a spring 5a secured in turn to a partition 6a provided in the upper chamber 2a and formed with orifices 7a interconnecting the two compartments of this upper chamber 2a. On the other hand, the diaphragm 4a is directly connected through a rod 8a to a valve member 9a disposed across the fuel pipe line feeding the turbojet engine, between the fuel pump and the feed jet. The upper chamber 2a contains a vessel closed by an elastic wall 31 for example of synthetic rubber composition, which contains anhydrous glycerin at 32 to 30° Bé. in which a sealed elastic bladder 33 filled with air is immersed.

The chambers 2a and 3a communicate with the pipe line 10a after downstream of the valve 9a through a by-pass comprising a section 12a connected to the chamber 2a, another section 13a connected to chamber 3a and a third section 14a connecting these sections 12a and 13a with each other and also with the pine line 10a. Section 12a connecting the upper chamber 2a with the pipe section 13a is provided with a jet 15a controlled by a barostatic bellows 16a enclosed in a case 17a receiving through a pipe 18a the total pressure to make due allowance for the aircraft speed. Moreover, an adjustment button 19a is associated with the barostatic bellows 16a.

The operation of this device is similar to that of the device described in the prior U.S. patent application mentioned hereinabove.

Of course, various modifications may be brought to the device shown and described herein, without departing however from the scope of the invention at set forth in the appended claims:

What I claim is:

1. In a liquid fuel supply system for engines, more particularly for turbojet engines, having a fuel feed line adapted to connect a fuel pump to the feed nozzles of the engine, an adjustable valve in said feed line normally open for a stable flow of fuel therethrough, a container, a flexible diaphragm defining two chambers in said container and one side of which is operatively connected to said adjustable valve, a perforated partition in said container disposed on the other side of said diaphragm, a spring disposed between said other side of the diaphragm and said partition, a by-pass interconnecting said two chambers in said container and having a restricted flow passage, and a pipe interconnecting the part of said by-pass which is connected to the chamber on said one side of the diaphragm with the adjustable valve and the feed line downstream of said valve; the improvement which comprises a vessel having an elastic wall and housed in the second chamber of the container remote from the diaphragm relatively to the partition, a fluid filling said vessel, and a sealed air-filled elastic bladder immersed in said fluid, the materials of said wall and bladder being chemically insensitive to said fluid, thereby to resist dissolution thereof in and modification of the air impermeability thereof by said fluid.

2. A liquid fuel supply system according to claim 1, wherein the sealed elastic bladder and the elastic wall are of a synthetic rubber composition, and wherein the fluid consists of anhydrous glycerin at 30° Bé.

3. In a liquid fuel supply system for engines, more particularly for turbojet engines, having a fuel feed line adapted to connect a fuel pump to the feed nozzles of the engine, an adjustable valve in said feed line normally open for a stable flow of fuel therethrough, a container, a flexible diaphragm defining two chambers in said container and one side of which is operatively connected to said adjustable valve, a perforated partition in said container disposed on the other side of said diaphragm, a spring disposed between the other side of said diaphragm and said partition, a by-pass interconnecting the two chambers defined in said container by said diaphragm and having a restricted flow passage, and a pipe interconnecting the part of said by-pass which is connected to the chamber on said one side of the diaphragm with the adjustable valve and the feed line downstream of said valve; the improvement which comprises a vessel having an elastic wall and housed in the second chamber of the container remote from the diaphragm relatively to the partition, a fluid filling said vessel, and a sealed air-filled elastic bladder immersed in said fluid, the sealed elastic bladder and the elastic wall being of a synthetic rubber composition, while the fluid consists of anhydrous glycerin at 30° Bé.

References Cited in the file of this patent
UNITED STATES PATENTS 2,683,485    Harris                July 13, 1954
2,763,280    Snyder              Sept. 18, 1956